Patented Dec. 19, 1933

1,940,592

UNITED STATES PATENT OFFICE 1,940,592

METHOD FOR THE PRODUCTION OF CHLORAMINE

Clark T. Henderson, Burlingame, Calif.

No Drawing. Application September 4, 1929
Serial No. 390,375

3 Claims. (Cl. 23—190)

This invention relates to a method of disinfecting and bleaching.

It is the primary object of the invention to provide a method of sterilizing and bleaching by chloramine, in which the advantages of chloramine treatment are combined with the simplicity of method attendant upon the use of compressed liquefied gases.

Another object of the invention is the provision of a method of producing chloramine by bringing together in dilute solution hypochlorous acid and ammonia.

Another object of the invention is to provide a method of disinfection of water by means of HOCl.

A further object of the invention is the provision of a method for the sterilization of pulp and white water streams by means of chloramine.

A still further object of the invention is the provision of a method for sterilization or bleaching, wherein dilute solution of hypochlorous acid, and dilute solution of ammonia in water are formed continuously, in a known and predetermined strength, and are mixed with each other continuously, to form a solution of chloramine of predetermined strength and quantity, by the use of which a sterilizing effect may be achieved, without imparting chlorine tastes and odors to the substance sterilized.

Other objects of the invention, together with the foregoing, will be set forth in the following description of the preferred method of practicing the same. It is to be understood that I do not limit myself to the embodiment disclosed in said description, and I may adopt variations of my preferred forms within the scope of my invention as set forth in the claims.

The value of chloramine ($NH_2Cl$) as a disinfectant is well known. Discovered by Raschig in 1902 (Chem. Zeit. 1907-21-926) its value as a germicidal agent was first noted by Rideal (S. J. Roy San. Inst. 1910-31 33/45).

Originally it was prepared by cooling dilute solutions of calcium hypochlorite and ammonia. The latter was added to the former in a flask surrounded by a freezing mixture.

In 1915 Race found that if dilute solutions of calcium hypochlorite and ammonia were mixed in the ratio of two parts by weight of available chlorine to one part by weight of ammonia, chloramine would be formed providing the concentration in the calcium hypochlorite does not exceed 5% available chlorine and that of the aqua ammonia does not exceed 2½%.

In 1917 the city of Ottawa, Canada, began the use of chloramine for the sterilization of its water supply, the chloramine being prepared by the reaction of dilute calcium hypochlorite with dilute aqua ammonia.

The same method was adopted by the city of Denver, Colorado.

The use of chloramine prepared as described above has since been discontinued, due largely, in my opinion, to the inconvenience of using calcium hypochlorite as compared with the simplicity of using chlorine as a liquefied gas. Also by reason of the fact that chlorine producers prefer to sell liquid chlorine rather than calcium hypochlorite commonly known as bleaching powder or bleach.

I have discovered that if a solution of chlorine in water is passed through calcium carbonate and thus converted to hypochlorous acid, it may then be converted to chloramine by bringing it into contact with a solution of ammonia in water. Thus we have means whereby it is possible to combine the advantages of chloramine treatment with the simplicity attendant upon the use of compressed liquefied gases.

Chlorine can be fed from a cylinder containing liquefied gas thru a suitable metering device and dissolved in water to form a solution of known and predetermined strength, and then by passing thru calcium carbonate it is converted to hypochlorous acid.

Ammonia can be fed from a cylinder likewise containing liquefied gas thru a metering device of similar character and dissolved in water to form continuously, a solution of predetermined strength.

These two solutions can be mixed continuously and thus produce continuously a solution of chloramine of predetermined strength and quantity.

If preferred the ammonia can be fed as aqua ammonia by means of a suitable metering device.

The chloramine thus produced is to be used for sterilization so as to produce the required free chlorine, with a minimum quantity of chlorine. For instance, in pulp mills, especially those producing ground wood or mechanical pulp, there is almost always a bacterial growth in the pulp stream and in the white water system, which produces slime growths that are troublesome. Also this bacterial action is accompanied by degeneration of the pulp and consequent discoloration. For example, in one instance the bacteria normally present cause the splitting up of the glucosides in the ground wood into glucose and tannin. The glucose is then available as bacteria food, while the tannin reacts with the iron, almost invariably present, to form iron tannate which darkens the pulp.

If an attempt is made to prevent or control bacterial action by the addition of chlorine, 80 to 100 p. p. m. is required in the white water before residual or free chlorine will be present. Without free chlorine present, the sterilization is so imperfect as to be of no practical value.

By first converting the chlorine by hypochlorous acid, then combining this with ammonia to form chloramine, then adding to the white water system, as little as 5 p. p. m. of chlorine will be sufficient to show residual or free chlorine and, moreover, there will continue to be free chlorine present for an hour or more. The reduction in total quantity of chlorine required and the prolongation of effect make the use of chlorine in the form of chloramine a practical, economic procedure whereas the use of chlorine per se is not effective, practical or economically sound.

Furthermore I have found that 100% killing of bacteria present in the white water system is not feasible. In order to prevent the residual bacteria from breaking down glucosides and thus forming iron tannate, I add to the pulp, at the time the white water is removed therefrom, a small quantity of readily available carbohydrate such as glucose, levulose, suchrose, starch or mixtures of these, such as molasses which are readily available as bacteria food, and this prevents the residual bacteria from breaking down glucosides and other complex organic materials thus preserving the color of the pulp.

Due to its stability and persistency in the presence of organic matter, chloramine produced by the means outlined above is the ideal material for the sterilization of effluent from sewage disposal plants. Sewage effluent normally requires 75 to 125 p. p. m. of chlorine to satisfy its oxygen demand. Chloramine in quantities as low as 5 p. p. m. are sufficient to sterilize sewage effluent.

Again chlorine, when added to water containing small quantities of organic matter, forms organic chlorides thus imparting both odor and taste to the water. I have found that if the chlorine is added in the form of hypochlorous acid it will have the same sterilizing effect and value of chlorine without imparting chlorine tastes and odors to any appreciable extent.

It is to be noted that in all the above processes the optimum ratio between the hypochlorous acid and the ammonia is approximately 17 parts by weight of ammonia to 35.5 parts by weight of available chlorine. While chloramine may be readily obtained by a mixture below the aforesaid ratio, it could not be efficiently obtained, if the mixture exceeds the above ratio.

Having thus described this invention, what I claim and desire to secure by Letters Patent is:

1. The method of producing chloramine which comprises dissolving chlorine in water, contacting this solution with calcium carbonate and then combining the resulting product with ammonia.

2. The method of producing chloramine which comprises dissolving chlorine in water, passing the solution upward thru calcium carbonate, and then combining the resulting product with ammonia.

3. The method of producing chloramine which comprises dissolving chlorine in water; contacting this solution with calcium carbonate; and then combining the resulting product with ammonia in a ratio not to exceed 17 parts by weight of ammonia to 35.5 parts by weight of available chlorine.

CLARK T. HENDERSON.